US011047015B2

(12) United States Patent
Sosinsky et al.

(10) Patent No.: US 11,047,015 B2
(45) Date of Patent: Jun. 29, 2021

(54) MANUFACTURE OF LOW CARBON STEEL

(71) Applicant: NUCOR CORPORATION, Charlotte, NC (US)

(72) Inventors: David J. Sosinsky, Carmel, IN (US); Dustin E. Smith, Waynetown, IN (US)

(73) Assignee: Nucor Corporation, Charlotte, NC (US)

(*) Notice: Subject to any disclaimer, the term of this patent is extended or adjusted under 35 U.S.C. 154(b) by 548 days.

(21) Appl. No.: 16/110,208

(22) Filed: Aug. 23, 2018

(65) Prior Publication Data
US 2019/0062854 A1 Feb. 28, 2019

Related U.S. Application Data

(60) Provisional application No. 62/549,926, filed on Aug. 24, 2017.

(51) Int. Cl.
C21C 7/068 (2006.01)
C21C 7/10 (2006.01)
(Continued)

(52) U.S. Cl.
CPC ............ *C21C 7/068* (2013.01); *B22D 11/001* (2013.01); *B22D 11/0622* (2013.01);
(Continued)

(58) Field of Classification Search
CPC ....... C21C 7/068; C21C 7/0075; C21C 7/064; C21C 7/076; C21C 7/10; C21C 2300/08; B22D 11/001; B22D 11/0622
See application file for complete search history.

(56) References Cited

U.S. PATENT DOCUMENTS 3,793,000 A 2/1974 Miltenberger
4,054,445 A 10/1977 Ramacciotti
(Continued)

FOREIGN PATENT DOCUMENTS

CN 101096716 A 1/2008
DE 19650498 A1 4/1998
(Continued)

OTHER PUBLICATIONS

Hallberg M et al: "Sulphur and hydrogen refining during vacuum degassing—a new concept for process control", stahl und eisen, vol. 125, No.5,May 18, 2005(May 18, 2005), pp. 39-46,48, Dusseldorf, DE, ISSN: 0340-4803.
(Continued)

Primary Examiner — Scott R Kastler
(74) Attorney, Agent, or Firm — Hahn Loeser & Parks LLP

(57) ABSTRACT

Embodiments include a method of making steel with low carbon content which includes preparing a heat of molten steel composition in a steelmaking furnace to a tapping temperature ranging from 2912 to 3060 degrees F. and tapping into a ladle the molten steel composition having an oxygen level is about 700 to 1000 ppm. The molten steel composition is then transported to a ladle metallurgy furnace, where the molten steel composition is further heated and one or more elements are added to the molten steel composition. The molten steel composition is then transported from the ladle metallurgy furnace to a vacuum tank degasser. The molten steel composition is then decarburized and one or more elements are added to the molten steel composition at the vacuum tank degasser for deoxidization and desulphurization. The molten steel composition is then transported to a ladle metallurgy furnace to further adjust chemistry and temperature.

23 Claims, 6 Drawing Sheets

(51) Int. Cl.
  *B22D 11/00* (2006.01)
  *C21C 7/064* (2006.01)
  *B22D 11/06* (2006.01)
  *C21C 7/00* (2006.01)
  *C21C 7/076* (2006.01)

(52) U.S. Cl.
  CPC ............ *C21C 7/0075* (2013.01); *C21C 7/064* (2013.01); *C21C 7/076* (2013.01); *C21C 7/10* (2013.01); *C21C 2300/08* (2013.01)

(56) References Cited

U.S. PATENT DOCUMENTS

| | | | |
|---|---|---|---|
| 4,152,140 | A | 5/1979 | Hori et al. |
| 4,378,242 | A | 3/1983 | Harris et al. |
| 4,612,043 | A | 9/1986 | Gray et al. |
| 4,979,983 | A | 12/1990 | Nishikawa et al. |
| 5,110,351 | A | 5/1992 | Hunter et al. |
| 5,228,902 | A | 7/1993 | Bogan et al. |
| 5,252,120 | A | 10/1993 | Finkl et al. |
| 5,279,639 | A | 1/1994 | Kemeny et al. |
| 5,304,231 | A | 4/1994 | Kato et al. |
| 5,413,623 | A | 5/1995 | Oonuki et al. |
| 5,472,479 | A | 12/1995 | Ahlborg |
| 5,520,718 | A | 5/1996 | Keilman et al. |
| 5,851,262 | A | 12/1998 | Mukai |
| 5,902,374 | A | 5/1999 | Kitamura et al. |
| 7,281,569 | B2 | 10/2007 | Blejde et al. |
| 7,485,196 | B2 | 2/2009 | Blejde et al. |
| 7,998,237 | B2 | 8/2011 | Pleschiutschnigg et al. |
| 8,105,415 | B2 | 1/2012 | McQuillis et al. |
| 8,313,553 | B2 | 11/2012 | Geldenhuis et al. |
| 9,149,868 | B2 | 10/2015 | Williams et al. |
| 2010/0314069 | A1* | 12/2010 | Wechsler ............... B22D 11/20 164/452 |
| 2012/0180601 | A1* | 7/2012 | Panda ................... C21C 7/0645 75/500 |
| 2019/0062854 | A1* | 2/2019 | Sosinsky .............. B22D 11/001 |

FOREIGN PATENT DOCUMENTS

| | | |
|---|---|---|
| EP | 0665295 A1 | 8/1995 |
| JP | H05230516 A | 9/1993 |
| JP | H06207212 A | 7/1994 |
| JP | H07035527 B | 4/1995 |
| JP | 2000178634 A | 6/2000 |
| JP | 2003089815 A | 3/2003 |
| KR | 100226931 B1 | 7/1999 |
| KR | 100270109 B1 | 10/2000 |
| WO | 2010015020 A1 | 2/2010 |

OTHER PUBLICATIONS

International-type Search for Provisional Patent Application issued by IP Australia for Australian Application No. 2017904031 dated Nov. 7, 2017, 10 pages.

Holger Arnold et al., Conference Paper on "Secondary Metallurgy for BOF Steel Making", Linz Austria, Oct. 2006, Paper No. 7.3, p. 1-9, 10 pages.

\* cited by examiner

Steelmaking Furnace

Ladle Metallurgy Furnace

Vacuum Tank Degasser

Ladle Metallurgy Furnace

MANUFACTURE OF LOW CARBON STEEL

This application claims priority to, and the benefit of, U.S. Provisional Application No. 62/549,926 filed on Aug. 24, 2017 with the United States Patent Office, which is hereby incorporated by reference.

BACKGROUND

Certain commercial steel compositions require relatively low amounts of carbon (less than 0.035%), nitrogen (less than 50 parts per million (ppm)), and sulfur (less than 30 ppm). In the past, methods of producing these low carbon and low sulfur steels used a combination of processes in a steelmaking furnace and a degasser. Certain prior methods involved reducing the carbon levels in the steel composition in the steelmaking furnace, such as an electric arc furnace (EAF), making alloy additions during the tapping process to desulfurize and alloy the steel, and then shipping the steel to the degasser, such as a vacuum tank degasser (VTD). This processing route was simple and quite straightforward.

To achieve the steel composition requirements of such commercial grades in the past, steel with very low carbon levels, such as less than 0.025%, was tapped at the steelmaking furnace. The dissolved oxygen levels associated with these low carbon amounts were in the order of 1200 ppm to 1400 ppm in the furnace before tapping. Where the degasser was a distance from the furnace, the steel was tapped at approximately 3140° F. (approximately 1727° C.) to compensate for temperature losses during transportation to the degasser and thereafter. During the tapping process, the steel was deoxidized with aluminum and ferrosilicon (FeSi). Lime and aluminum dross were also added to create a fluid, deoxidized, desulfurizing slag. By these additions, the desulfurizing reaction was started in the ladle during shipping to the degasser. At the degasser, further additions of aluminum, lime, calcium aluminate, and dolomitic lime were made to ensure desired sulfur removal during the degassing cycle. While aluminum is used as the primary deoxidant, these steel compositions are commercially considered to be silicon-killed steels.

The prior process had drawbacks, including high refractory wear on the steelmaking furnace. The elevated tapping temperatures and high oxygen content required before tapping the steelmaking furnace had an adverse effect on productivity at the furnaces. The high temperatures and high oxygen conditions enabled high amounts of FeO in the slag at the high temperatures, causing excessive refractory wear on the furnace walls. This led to increased furnace downtimes while the furnace refractories were patched with gunite. Also, the high FeO content in the slag results in lower efficiency in steelmaking as more iron units are lost in the slag.

The prior process also required the use of low carbon alloys and additives throughout the subsequent processes from the steelmaking furnace to maintain the low carbon level below 0.035% by weight. Low carbon alloying elements, such as low carbon FeMn, were required to provide desired elements without upsetting the final carbon content of the steel. Recently, the price of low carbon ferro-alloys has increased significantly, making this method economically undesirable to produce such low carbon steel. Further, lowering the amount of carbon in the steel composition in the steelmaking furnace required additional decarburization time, which also adversely affected productivity at the steelmaking furnace. Cost was further increased as a result of more silicon and aluminum required to deoxidize the steel composition as a result of the higher oxygen content.

In other prior art methods involved preparing a heat of molten steel in a steelmaking furnace, such as an EAF, tapping the molten steel composition into a ladle with an oxygen level between about 600 and 1120 ppm, adding slag forming compound to the ladle to form a slag cover over the molten steel composition in the ladle, transporting the molten steel composition in the ladle to a vacuum tank degasser, decarburizing the molten steel composition at the vacuum tank degasser by drawing a vacuum of less than 650 millibars with an oxygen level in the molten steel composition correlated with an amount of carbon desired in the steel composition without adding external oxygen to the molten steel composition, after decarburizing, adding one or more deoxidizers to the molten steel composition, deoxidizing the molten steel composition, adding one or more flux compounds, after deoxidizing, to desulfurize the molten steel composition, and casting the molten steel composition to form a steel with low carbon less than 0.035% by weight.

One drawback of these prior methods is the requirement to heat the molten steel to an relatively high temperature in the electric arc furnace prior to tap and further processing. Not only does the generation of these elevated temperatures incur excessive costs and consume additional resources, the equipment is exposed to excessive wear and tear, impacting the longevity of the equipment. Another drawback of the prior methods is the inability to properly maintain the temperature of the molten steel after tap and while the molten steel undergoes post-tap processing, and, in particular, when alloying, which can further complicate this issue by consuming heat via endothermic reactions.

In view of the foregoing, there remains a need to reduce production costs for low carbon, low nitrogen, and low sulfur steels. More specifically, there remains a need to more efficiently reach the necessary temperature for treatment of a thin cast strip product at a vacuum tank degasser.

SUMMARY

We have found an alternative method of making a steel with low carbon, less than 0.035% by weight, that increases steelmaking efficiency.

Disclosed is a method of making steel with low carbon, less than 0.035% by weight, comprising the steps of:
(a) preparing a heat of molten steel composition in a steelmaking furnace to a tapping temperature ranging from 2912 to 3060 degrees F.;
(b) tapping into a ladle the molten steel composition having an oxygen level of about 700 to 1000 ppm;
(c) transporting the molten steel composition in the ladle, after tapping, to a ladle metallurgy furnace where the molten steel composition is further heated and one or more flux elements and/or one or more alloy elements are added to the molten steel composition;
(d) transporting the molten steel composition in the ladle from the ladle metallurgy furnace to a vacuum tank degasser after the ladle metallurgy furnace;
(e) decarburizing the molten steel composition at the vacuum tank degasser;
(f) adding one or more alloying elements and/or one or more flux elements to the molten steel composition at the vacuum tank degasser for deoxidization and desulphurization;
(g) transporting the molten steel composition in the ladle from the vacuum tank degasser and to a ladle metallurgy furnace to adjust chemistry and temperature; and, (h) casting the molten steel composition to form a steel with low carbon content that is less than 0.035% by weight.

While other steelmaking furnaces may be employed, in particular embodiments, the steelmaking furnace is an electric arc furnace.

While tapping, one or more flux elements and/or one or more alloying elements may, or may not, be added to the molten steel composition. For example, in certain instances, the one or more flux elements and/or one or more alloying elements includes lime and calcium silica. In certain instances, the amount of carbon in the molten steel composition during tapping is 0.02% to 0.05% by weight, although other variations may be employed in other instances. It is appreciated that varying amounts of sulfur may be present in the molten steel composition while tapping. In certain instances, for example, the amount of sulfur in the molten steel composition while tapping is 0.02% to 0.06% by weight. In certain instances, one or more deoxidizers may be added during tapping, such as FeMn, for example.

After tapping, the molten steel composition is transferred to a ladle metallurgy furnace. One purpose of the ladle metallurgy furnace is to further heat the molten steel composition, such as to facilitate further changes in chemistry and/or to account for heat losses occurring prior to transportation to the ladle metallurgy furnace. In the first visit to a ladle metallurgy furnace, the molten steel may be heated to a temperature, such as a temperature within a range of 2975 degrees F. to 3075 degrees F., and departs the ladle metallurgy furnace for the vacuum tank degasser at a temperature within that range. In one particular instance, the molten steel is heated to substantially 3050 degrees F., and departs the ladle metallurgy furnace for the vacuum tank degasser at substantially 3050 degrees F.

When adding one or more flux elements at the ladle metallurgy furnace, it is appreciated that any of a variety of flux elements may be added, while in certain variations, the one or more flux elements include manganese and lime. The additions of manganese and lime may take any form suitable for its intended purpose as a flux element. For example, in certain instances the manganese is added in the form of medium carbon manganese (MCMn).

In certain variations of the method described herein, the oxygen content in molten steel is measured after processing at the ladle metallurgy furnace is concluded and before decarburizing processing begins at the vacuum tank degasser. In more specific instances, the oxygen content is measured before sending the molten steel to the vacuum tank degasser.

Decarburization of the molten steel composition at the vacuum tank degasser is performed by drawing a vacuum, which may be any desired vacuum but which in certain instances is less than 650 millibars. Optionally, decarburization of the molten steel composition may be performed with an oxygen level in the molten steel composition correlated with an amount of carbon desired in the steel composition without adding external oxygen to the molten steel composition.

In certain instances, correlating the oxygen level in the molten steel composition with an amount of carbon desired in the steel composition includes: (i) stirring the molten steel composition in the ladle at the vacuum tank degasser, (ii) measuring and recording the amount of carbon in the steel composition, the amount of oxygen in the steel composition, and the temperature of the steel composition, (iii) providing a process model correlating amounts of oxygen and carbon in steel composition with decarburization time needed to reach a desired amount of carbon in the steel composition; and (iv) determining, by the process model, a decarburization time based on the measured amounts of oxygen and carbon in the steel composition.

In other instances, correlating the oxygen level in the molten steel composition with an amount of carbon desired in the steel composition includes: (i) stirring the steel composition in the ladle at the vacuum tank degasser, (ii) measuring and recording the amount of carbon in the steel composition, the amount of oxygen in the steel composition, and the temperature of the steel composition, (iii) providing a process model correlating amounts of oxygen and carbon in steel composition with amounts of deoxidizing addition needed to deoxidize the steel composition and (iv) determining, by the process model, an amount of deoxidizing addition to the steel composition based on the measured amounts of oxygen and carbon.

In yet further instances, correlating the oxygen level in the molten steel composition with an amount of carbon desired in the steel composition includes: (i) stirring the steel composition in the ladle at the vacuum tank degasser, (ii) measuring and recording the amount of carbon in the steel composition, the amount of oxygen in the steel composition, and the temperature of the steel composition; (iii) providing a process model correlating amounts of oxygen and carbon in steel composition with amounts of flux elements needed to desulfurize the steel composition, capable of selecting one or more flux elements based on the price of the flux elements; and (iv) determining, by the process model, a selection of flux elements and their amounts based on the measured amounts of oxygen and carbon.

When at the vacuum tank degasser, in certain variations of the method, adding one or more alloying elements and/or one or more flux elements to the molten steel composition includes adding one or more deoxidizers. It is appreciated that the one or more deoxidizers may include any known deoxidizer. For example, in certain instances, the one or more deoxidizers added include one or more deoxidizers selected from a group consisting of aluminum, ferrosilicon (FeSi), lime, calcium silicate ($Ca_2SiO_4$), and ferrosilicomanganese (FeSiMn).

As noted previously, one or more alloying elements and/or one or more flux elements are added to the molten steel composition at the vacuum tank degasser for deoxidization and desulphurization. For example, in certain instances the one or more flux elements added are selected from a group consisting of lime, dolomitic lime, aluminum, calcium aluminum, wollostonite, fluorspar, silica sand, ferrosilicon, ferrosilicomanganese (FeSiMn), and a perfused synthetic flux. In particular instances, a desired amount of aluminum is added at a vacuum level between 530 and 1000 millibars. Deoxidization occurs prior to desulphurization at the vacuum tank degasser. At the vacuum tank degasser, a vacuum is drawn, such as between about 1 to 2.5 millibar for nitrogen removal in certain instances.

As noted previously, after departing the vacuum tank degasser the molten steel composition is transferred to a ladle metallurgy furnace. This ladle metallurgy furnace may be the same as initially visited after tapping and before transferring the molten steel composition to the vacuum tank degasser, or may be a different ladle metallurgy furnace. During this second visit to a ladle metallurgy furnace, the molten steel composition is further heated, such as to facilitate further changes in chemistry and/or to account for heat losses occurring prior to transportation to the ladle metallurgy furnace. The chemistry thereof may also be further adjusted at the ladle metallurgy furnace, which may include the addition of any further alloys and/or fluxes.

After the second visit to a ladle metallurgy furnace, the molten steel may be cast. While casting of the molten steel composition may result in the formation of any cast steel product as desired, in certain instances, a thin strip is cast using a thin strip caster. Any thin strip caster may be employed. For example, in particular embodiments, a thin strip caster employed for strip casing includes:
  (a) a pair of counter-rotatable casting rolls having casting surfaces laterally positioned to form a gap at a nip between the casting rolls through which a thin metal strip having a thickness of less than 5 mm can be cast; and,
  (b) a metal delivery system adapted to deliver molten metal above the nip to form a casting pool, the casting pool being supported on the casting surfaces of the pair of counter-rotatable casting rolls and confined at the ends of the casting rolls.
In such embodiments, the casting includes:
  (a) delivering the molten steel composition to the metal delivery system;
  (b) delivering the molten steel composition metal delivery system above the nip to form the casting pool; and,
  (c) counter rotating the pair of counter-rotatable casting rolls to form metal shells on the casting surfaces of the casting rolls that are brought together at the nip to deliver the thin metal strip downwardly, the thin metal strip having a thickness forming any desired thickness, such as, for example, a thickness of less than 5 mm.

DETAILED DESCRIPTION OF THE DISCLOSURE

Figure 1:
FIG. 1 is a flow chart showing the general process of steelmaking according to the present disclosure.
Figure 1:
Figure 1:

The process for producing low carbon steel grades is schematically shown in FIG. 1. In a process for preparing steel for casting, the steel typically progresses from an electric arc furnace (EAF) to a ladle metallurgy furnace (LMF), and then to a vacuum tank degasser (VTD) and then again to a ladle metallurgical furnace (LMF). Thereafter, the steel is cast. The steel grades produced by the presently disclosed method have low carbon less than about 0.035% by weight. The steel grade also typically has low nitrogen less than about 0.005% by weight and low sulfur less than about 0.003% by weight or less than about 0.0015% by weight.

A steel melt shop typically has one or more EAF, such as a 120 ton (metric ton) EAF equipped with 110 megavolt-ampere (MVA) transformers. Such EAFs may be between about 30 ton and 400 ton capacity, but are generally for continuous casting between 60 and 120 tons capacity. Each furnace may contain gas injection lances, such as a Co-Jet™ brand three-lance gas injector system from Praxair, through which a combination of oxygen and natural gas can be blown into the furnace, as well as a carbon injection pipe. These may be used to inject carbon and oxygen at different ratios throughout the heating of the steel to create a foamy EAF slag. Preparation of a foamy slag has been described in Pretorius, E. B. and R. C. Carlisle, *Foamy Slag Fundamentals and Their Practical Application to Electric Furnace Steelmaking*, ISS-AIME, EF Conference Proceedings, 1998, pp. 275-291. The EAF may also be equipped with a top feed flux system through which lime, dolomite, and carbon can be fed to control the slag basicity and viscosity for better slag foaming while melting. In certain instances, lime and calcium silicate are added to the molten steel composition in the EAF when approximately 30 tons of the molten steel is present, where approximately 1500 pounds of each are added.

The molten steel in the heat of an EAF is tapped when the oxygen content and temperature of the molten steel composition are within desired parameter ranges. With regard to oxygen content, in certain instances, tapping is targeted to occur when the oxygen level in the steelmaking furnace is about 700 to 1000 ppm. With regard to temperature, tapping is targeted to occur when the molten steel composition in the steelmaking furnace is a temperate in the range of 3092 to 3060 degrees F. (1600 to 1862 degrees C.). Optionally, as mentioned previously, in certain instances the amount of sulfur in the molten steel composition, at the time of tapping, is between about 0.02% and 0.06% by weight and/or the amount of carbon in the molten steel composition, at the time of tapping, is about 0.02% to 0.05% by weight. As the EAF is located remote from the LMF, the tapping temperature of the molten steel composition at the EAF is selected to allow for a temperature decrease during transit from the EAF to the LMF to provide a desired temperature at the LMF.

The steel composition may be tapped from the furnace into a ladle through an eccentric bottom tap hole (EBT) system, which is typically designed to minimize carry-over slag from the EAF into the ladle during tapping. For example, in a 120 ton capacity EAF, about 105 ton of steel is tapped from the furnace into the ladle. The ladles are typically equipped with two porous plugs capable of introducing argon into the steel composition as desired. The porous plug hook-up may use automated connections through corresponding ladle trunnions. While tapping, one or more flux elements and/or one or more alloying elements may be added to the molten steel composition. For example, in certain instances, adding one or more flux elements and/or one or more alloying elements includes adding lime, or a suitable form of lime, and calcium silicate. The tap station is also equipped with a measurement system capable of measuring and recording the steel temperature directly after tapping, and may be capable of measuring and recording additional information such as oxygen level in the steel composition. As soon as the tapping process is completed, a slag sample may be taken from the EAF to measure the amount of any element or compound within the EAF slag, such as FeO, for example.

In the present method, decarburization is not completed in the EAF as in certain past processes. Instead, in the present method, the EAF tap oxygen is lowered with correspondingly higher tap carbon levels. This improved method includes the steps of tapping at the steelmaking furnace and decarburizing at the VTD. Tapping may or may not comprise open tapping (or tapping open), where open tapping means tapping without an intentional addition of deoxidizers. In the present method, the tap oxygen content of the steel is lowered to 700 ppm to 1000 ppm. In other words, tapping occurs when the lower oxygen content is in the lower range of 700 ppm to 1000 ppm. Also, tapping at the EAF is performed at lower temperatures as compared to the prior methods. Tapping at lower oxygen levels is facilitated, in certain instances, by employing certain weaker deoxidizers, the addition of which may occur at tap and/or during deoxidation steps discussed herein, where the weaker deoxidizers drop the oxygen content less than other deoxidizers. For example, manganese or certain compounds including manganese, such as FeMN, may operate as weak deoxidizers and may drop the oxygen content by approximately 200 ppm, which is unlike stronger deoxidizers comprising silicon and aluminum, for example.

When the LMF is a distance from the steelmaking furnace, the tap temperature may be between about 2912 to 3060 degrees F. (1600° C. and 1682° C.) to allow for a temperature decrease during transit from the furnace to the LMF. When the transit time to the LMF is less, the tap temperature may be lower. During the present tapping step, the argon plugs are shut off so that the steel composition may not be stirred. As soon as tapping from the furnace into the ladle is completed, a steel sample may be taken, and an addition of slag forming compound such as lime added to the ladle to cover the steel to reduce heat losses and oxidation during transportation to the LMF. A lid may desirably be placed onto the ladle before its transport to the LMF.

The present tapping step is in contrast to certain prior processes where lime, calcium aluminate, aluminum, slag deoxidant. and ferrosilicon additions were made to the steel composition during tapping, and the steel composition in the ladle was stirred throughout the tapping process to mix the additions with the steel composition. In certain instances, the steel composition may not be stirred during tapping. Additionally, while the addition of lime may be made to cover the steel in the ladle, in certain instances, no alloy elements are added during tapping, although flux addition(s) may be made during tapping, such as, for example, the addition of lime together with the addition of another flux element, such as calcium silica or calcium silicate, for example. Additionally, or separately, one or more deoxidizers may be added during tapping, such as FeMn, for example.

Certain prior processes required tapping the steel composition from the EAF at very low carbon levels, such as less than 0.025% carbon, after which a partial desulfurization was done in the ladle after tap, and then desulfurization completed and hydrogen and nitrogen removed at the VTD. In the prior process, the average tap temperature was 3140° F. (1727° C.). In addition, the average dissolved oxygen content (tap oxygen) was 1398 ppm in the EAF prior to tapping, which resulted in an average carbon content of 0.022% in the ladle. The average FeO content of the slag was 38.6% in the prior process. During the prior tapping process, FeSi, aluminum, and lime additions were made to the ladle. Additionally, aluminum dross was added to the ladle to reduce the concentration of the reducible oxides, FeO and MnO from the carried-over EAF slag. The typical carry-over EAF slag was typically less than 500 kg.

In the present method of making steel with low carbon less than 0.035% by weight, the steel composition is tapped at the furnace, without deoxidizing additions or with small additions one or more deoxidizers. As discussed below, the tapping step reduces the ability for desulfurization in the ladle prior to the VTD.

After tapping, the molten steel composition is transferred to a LMF. One purpose of the LMF is to further heat the molten steel composition. In the first visit to a LMF, the molten steel may be heated to a temperature within a range of 2975° F. to 3075° F. The molten steel departs the LMF for the VTD at a temperature within the range. In one particular instance, the molten steel is heated to substantially 3050° F., and departs the LMF for the VTD at substantially 3050° F.

The temperature of at substantially 3050° F. at the VTD is necessary to complete the treatment of the thin cast strip product of the present disclosure. The treatments at the VTD are discussed in greater detail herein. Reaching this temperature, however, places significant strain on the furnaces and wear on the refractories. In particular, during prior processes, where the molten steel composition is heated to a tapping temperature necessary for decarburization at a VTD, the EAF experienced significant refractory wear, thereby, reducing refractory life. By reducing the tapping temperature at the EAF of the present disclosure, the maintenance cycles and refractory life at the EAF are prolonged. This is accomplished by transferring the molten steel composition for further processing at a LMF, after tapping but prior to the decarburizing process at the VTD. Further processing at the LMF boosts the temperature of the molten steel to the temperature necessary for treatment at the VTD. This, however, is accomplished independent of heating the molten steel to the tap temperature at the EAF, thereby, resulting in lower tapping temperatures at the EAF.

As mentioned above, flux elements are added at the LMF instead of during tapping at the EAF. When adding one or more flux elements at the LMF, it is appreciated that any of a variety of flux elements may be added, while in certain variations, the one or more flux elements include manganese and lime. The additions of manganese and lime may take any form suitable for its intended purpose as a flux element. For example, in certain instances the manganese is added in the form of medium carbon manganese (MCMn). In certain instances, 1000 pounds of lime are added, and MCMn is added according to the following chart where about 105 ton of steel is tapped from the furnace into the ladle:

| 1005 Grades | 1004 Grades | MCMn, lbs. |
| --- | --- | --- |
| S8/S6 | N/A | 500 |
| S4/S1 | S4/S2 | 1000 |
| S2/S5/S7 | S5 | 1500 |
| S3 | S1/S3/S6 | 2000 |

In certain variations of the method described herein, the oxygen content in molten steel is measured after processing at the LMF is concluded and before decarburizing processing begins at the VTD. In more specific instances, the oxygen content is measured before sending the molten steel to the VTD.

After tapping and processing at the LMF, the molten steel composition is transported in a ladle to the VTD for decarburization and for further treatment to reduce hydrogen and nitrogen content and to desulfurize the steel composition. The ladle may be transported by a vehicle or an overhead crane. Upon arrival at the VTD, the ladle may be moved via an overhead crane and placed in the VTD tank. Once in the VTD, porous plug connections may be made, the plugs opened, and argon introduced through the porous plugs in the steel composition in the ladle using argon gas at flow rates typically of less than 1 m³/min. The flow of argon causes an initial stifling to break-up and liquefy the slag, and make the steel temperature more even through the ladle. When the slag becomes liquefied, the porous plugs are turned off, and measurements of the temperature and amount of oxygen, and optionally, amount of carbon, are recorded. Alternatively, measurements of the temperature, the amount of oxygen, and the amount of carbon may be taken prior to stifling. These measurements at the VTD and the measurements at the furnace recorded before and/or after tapping may be used to determine the alloy and flux additions to the steel composition, and used to determine the amount of time for the decarburization step at the VTD.

In the present method of making steel with low carbon less than 0.035% by weight, the decarburization step is performed at the VTD followed by a deoxidation step at the VTD. Thereafter, a desulfurizing step and a nitrogen removal step at the VTD may be performed. Between the deoxidation and the desulphurizing steps, a slag building step may be performed.

The decarburization process may begin after the argon stirring is turned off and measurements of the temperature and amount of oxygen are recorded in the steel composition at the VTD. The lid is placed onto the ladle, and the tank evacuation begins. As a vacuum is drawn on the ladle, gases are removed from the steel composition in the ladle, including carbon monoxide (CO), hydrogen, and nitrogen. As the vapor pressure of CO is reduced above the steel composition, additional carbon and oxygen react to form CO, which is drawn from the steel composition. We have found that the reaction of carbon and oxygen provides sufficient stirring action and no argon stirring is required. Vacuum levels of less than 650 millibars are used during decarburization. The vacuum levels may be between about 1 millibar and 650 millibar during decarburization, and, more specifically, may be between 350 and 550 millibars or below 530 millibars.

After decarburization in the VTD, deoxidization is performed. In doing so, one or more deoxidizers are added. It is appreciated that the one or more deoxidizers may include any known deoxidizer. For example, in certain instances, the one or more deoxidizers include one or more deoxidizers selected from a group consisting of aluminum, ferrosilicon (FeSi), lime, calcium silicate ($Ca_2SiO_4$), and ferrosilicomanganese (FeSiMn). In certain instances, an aluminum addition, in any suitable form, is made to the steel composition for deoxidization. Desired combinations of lime, aluminum, calcium aluminate, dolomitic lime, ferrosilicomanganese (FeSiMn), wollostonite, fluorspar, silica sand, ferrosilicon, perfused synthetic flux, and other fluxes are also added to form a desulfurizing slag. Additions are added to the steel composition in the ladle through a pressure equalization hopper at desired times in the process. The addition of aluminum under vacuum is reactive. Prior to adding aluminum, the vacuum level may be adjusted to between about 530 and 1000 millibar.

In particular instances, after decarburization, the following elements are added to the molten steel composition at the VTD for each respective steel grade where about 105 ton of steel is tapped from the furnace into the ladle:

Steel Grade: 1005S8, 1005S6

| Addition | Weight, lbs |
|---|---|
| Aluminum | 400 |
| 75% FeSi | 400 |
| Lime | 1200 |

| Addition | Weight, lbs |
|---|---|
| CS | 300 |
| Spar | 150 |

Steel Grade: 1005S4, 1005S1, 1005S2, 1004S2, 1004S4

| Addition | Weight, lbs |
|---|---|
| Aluminum | 400 |
| 75% FeSi | 600 |
| Lime | 1200 |
| CS | 300 |
| Spar | 150 |

Steel Grade: 1005S5, 1005S3, 1004S1, 1004S3, 1004S5, 1004S6

| Addition | Weight, lbs |
|---|---|
| Aluminum | 400 |
| 75% FeSi | 700 |
| Lime | 1200 |
| CS | 300 |
| Spar | 150 |

As noted previously, the oxygen content in molten steel may be measured after processing at the LMF is concluded and before decarburizing processing begins at the VTD. In particular instances, if the incoming oxygen content measures less than 200 ppm, the addition of aluminum, per the three prior charts, is reduced by 100 pounds. In such instances, if the incoming oxygen content measures greater than 350 ppm, the following chart specifies additional amounts of aluminum and lime to be added to the amounts identified in the prior three charts:

| 350-425 ppm | Additional 50 lbs of Al | Additional 300 lbs of Lime |
| 425-500 ppm | Additional 100 lbs of Al | Additional 400 lbs of Lime |
| 500-575 ppm | Additional 150 lbs of Al | Additional 500 lbs of Lime |

Decarburization times and desired additions for deoxidization of the steel composition and slag building may be, in certain instances, previously determined using a process model. The process model may be used to control slag chemistry at the VTD, because the decarburization and deoxidation steps in the VTD affect the slag chemistry.

The measurements taken of the steel composition and the slag composition at the VTD and the measurements of the steel composition recorded after tapping may be fed into the process model, or an Addition Model. The Addition Model is an algorithm that may be used to analyze the measurements, or input data, and compare the input data to desired values or predetermined values. Based on the a difference between the input data and the desired or predetermined values, the Addition Model algorithm may determine which alloys and fluxes are to be added to the steel composition and their amounts to facilitate the removal of nitrogen and sulfur to the desired levels.

The Addition Model may use an optical basicity concept to generate better slag composition in terms of sulfide capacity. The optical basicity concept has been described in Sosinsky, D. J. and Sommerville, I. D., *The Composition and Temperature Dependence of the Sulfide Capacity of Metallurgical Slags*, Met. Trans. B, vol. 17B, 1986, pp. 331-337. In addition, the Addition Model uses a low cost combination of alloy and flux additions to produce the desired composition. The Addition Model is capable of providing a fluid, basic slag, and deoxidized steel composition with desired steel-slag mixing qualities.

As stated previously, optionally, decarburization of the molten steel composition may be performed with an oxygen level in the molten steel composition correlated with an amount of carbon desired in the steel composition without adding external oxygen to the molten steel composition. Accordingly, the Addition Model may use an algorithm based on empirical data correlating decarburization time with the amounts of oxygen and carbon in the steel composition after initial stirring at the VTD to determine a decarburization time. The Addition Model may use the amount of oxygen in the steel composition after initial stirring at the VTD to determine an amount of aluminum to add after decarburization. Based on the amount of aluminum and the amount of oxygen, the Addition Model projects desired flux additions to form a desulfurizing slag.

In certain instances, correlating the oxygen level in the molten steel composition with an amount of carbon desired in the steel composition includes: (i) stirring the molten steel composition in the ladle at the VTD, (ii) measuring and recording the amount of carbon in the steel composition, the amount of oxygen in the steel composition, and the temperature of the steel composition, (iii) providing a process model correlating the amounts of oxygen and carbon in steel composition with decarburization time needed to reach a desired amount of carbon in the steel composition; and (iv) determining, by the process model, a decarburization time based on the measured amounts of oxygen and carbon in the steel composition.

In other instances, correlating the oxygen level in the molten steel composition with an amount of carbon desired in the steel composition includes: (i) stirring the steel composition in the ladle at the VTD, (ii) measuring and recording the amount of carbon in the steel composition, the amount of oxygen in the steel composition, and the temperature of the steel composition, (iii) providing a process model correlating amounts of oxygen and carbon in steel composition with amounts of deoxidizing addition needed to deoxidize the steel composition and (iv) determining by the process model an amount of deoxidizing addition to the steel composition based on the measured amounts of oxygen and carbon.

In yet further instances, correlating the oxygen level in the molten steel composition with an amount of carbon desired in the steel composition includes: (i) stirring the steel composition in the ladle at the VTD, (ii) measuring and recording the amount of carbon in the steel composition, the amount of oxygen in the steel composition, and the temperature of the steel composition; (iii) providing a process model correlating amounts of oxygen and carbon in steel composition with amounts of flux elements needed to desulfurize the steel composition, capable of selecting one or more flux elements based on the price of the flux elements; and (iv) determining, by the process model, a selection of flux elements and their amounts based on the measured amounts of oxygen and carbon.

The Addition Model algorithm may provide the determined amounts to a controller capable of automatically adding the determined amount of selected alloys and fluxes to the steel composition. For example, the VTD may have four bins positioned for providing alloys and fluxes to the steel composition. The four bins may contain lime, aluminum, calcium aluminate, and either dolomitic lime or ferrosilicomanganese (FeSiMn), depending on the desired steel composition and slag composition. The controller may be capable of activating, independently, each bin to provide a measured amount of selected alloy or flux additions corresponding to the determined amount to the steel composition. After the required alloy and flux additions are weighed, they are added to the steel composition in the ladle through a pressure equalization hopper at desired times in the process.

As the desired additions are fed from the hopper, the tank lid is placed into its operating position. The porous plugs are turned on and the tank evacuation begins. The total cycle time in the VTD may be approximately 35 minutes.

After decarburization and deoxidation, vacuum levels of 1 to 2.5 millibar may be achieved for nitrogen removal. Alternatively or in addition, after desulfurization, vacuum levels of 1 to 2.5 millibar may be achieved for nitrogen removal. The pump down time to 1-2.5 millibar is typically less than 7 minutes, depending in part on the thermal history of the tank. The time to complete the desulfurization and nitrogen removal may be about 20 minutes.

Figure 2:
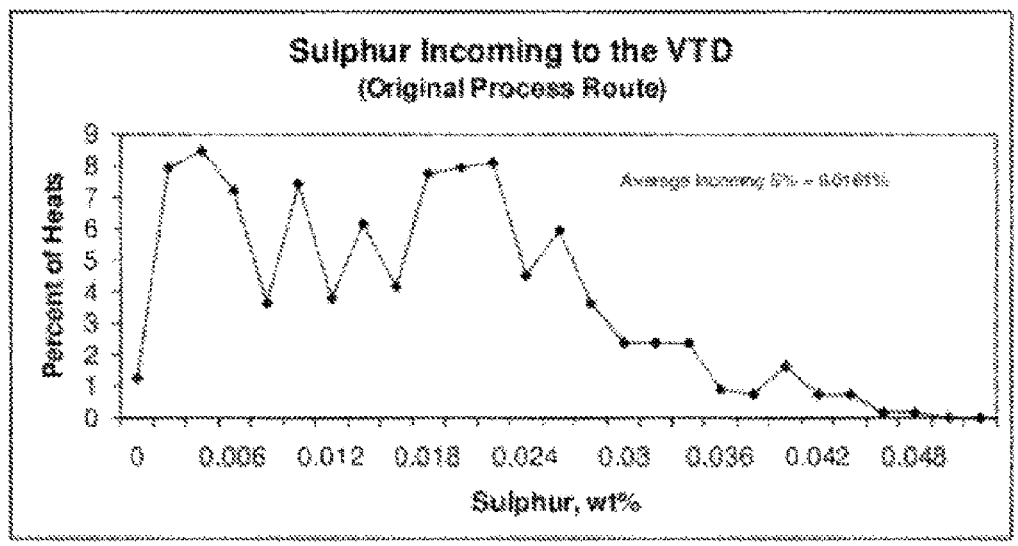
FIG. 2 is a graph of the sulfur content of heats entering the vacuum tank degasser using a prior process.

In the prior process, the Addition Model was programmed primarily for creating conditions capable of removing only sulfur and nitrogen. The prior process the steel composition had been partially deoxidized, in some heats, to about 6.6 ppm, with high incoming ladle temperatures of about 2990° F. (1645° C.). Since some desulfurization occurred after tap and during transport to the VTD, the distribution of the sulfur content in the incoming steel composition to the VTD was irregular. FIG. 2 shows distribution of the incoming sulfur to the VTD in the prior process. The average carbon, nitrogen and sulfur concentrations incoming to the VTD are tabulated in TABLE 1.

TABLE 1

Average carbon, nitrogen and sulfur concentrations incoming to the VTD for the prior process:

| Element | Concentration, wt % |
|---|---|
| Carbon | 0.022 |
| Nitrogen | 0.0072 |
| Sulfur | 0.016 |

As shown in TABLE 1, in the prior process, the carbon concentration of the steel composition was within a desired range, such as less than 0.035% carbon, directly from the EAF. As discussed above, this required a selection of alloy and flux additions to the steel composition at the VTD that would not upset the low carbon amount in the steel composition.

TABLE 2

Average VTD incoming slag composition (wt %) for the prior process:

| CaO | $SiO_2$ | $Al_2O_3$ | MgO | FeO + MnO |
|---|---|---|---|---|
| 57.8 | 5.6 | 28.4 | 7.7 | 0.5 |

With the present method, oxygen in and temperature of the steel composition are measured at the VTD in the incoming steel composition and again measured after the VTD cycle. Slag and steel samples are also taken after the degas cycle for chemical analysis. The target carbon and sulfur content of the steel composition after degassing may be about 0.015% and about 0.0010%, respectively. The average carbon, nitrogen and sulfur concentrations of the steel composition incoming to the VTD are shown in TABLE 3.

TABLE 3

Average carbon, nitrogen and sulfur concentrations incoming to the VTD for the present method:

| Element | Concentration, wt % |
| --- | --- |
| Carbon | 0.035 |
| Nitrogen | 0.0069 |
| Sulfur | 0.036 |

Once the degassing cycle is completed, the porous plugs are turned off, the VTD is returned to atmospheric pressure, and the lid is opened. At this time the steel composition and slag composition are sampled and the temperature and oxygen of the steel composition are measured. The steel composition in the ladle is then transported via overhead crane to a LMF for further alloying and heating to the required casting temperatures, as desired. In one specific example, the steel composition may be transferred in the ladle from the VTD to a LMF different than the LMF used after tapping.

This technique may also be used for preparing interstitial-free steel. The interstitial-free steel may have carbon levels below 0.01%, and may be below 0.005%.

Figure 3:
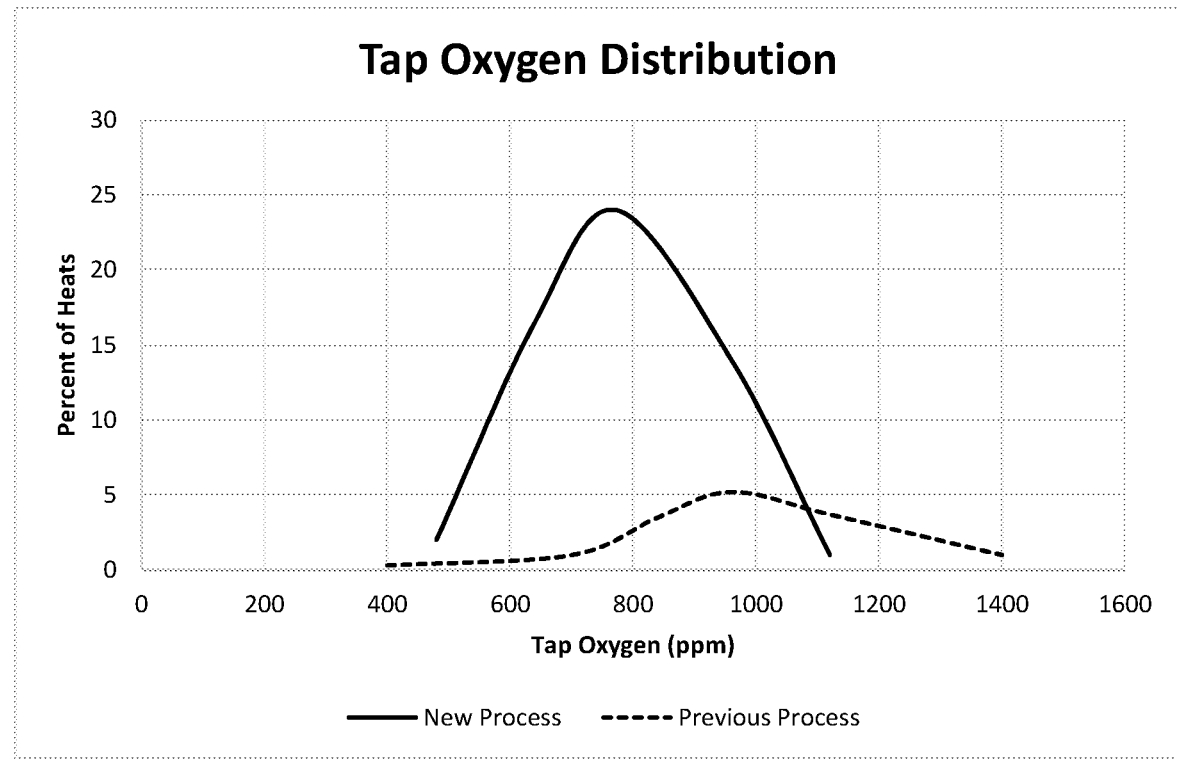
FIG. 3 is a graph of the oxygen distribution in the molten steel when tapping from an electric arc furnace as compared between the prior process and the presently disclosed method.

To determine the effectiveness of the present method, prior data recorded from 500 heats prepared using the prior process was compared to data from a two month trial production of 500 heats prepared using the presently disclosed method. The data included measurements including amounts of oxygen, carbon, and sulfur in the steel composition at the tapping step, the temperature of the steel composition at the tapping step, and the amount of FeO in the EAF slag composition. A comparison of the tap oxygen content of the steel composition between the prior process and the presently disclosed method is shown in FIG. 3. As shown in FIG. 3, the presently disclosed method provided a lower oxygen content than the prior process. The average tap oxygen decreased from 955 ppm for the prior process and to 750 ppm for the present method.

Figure 4:
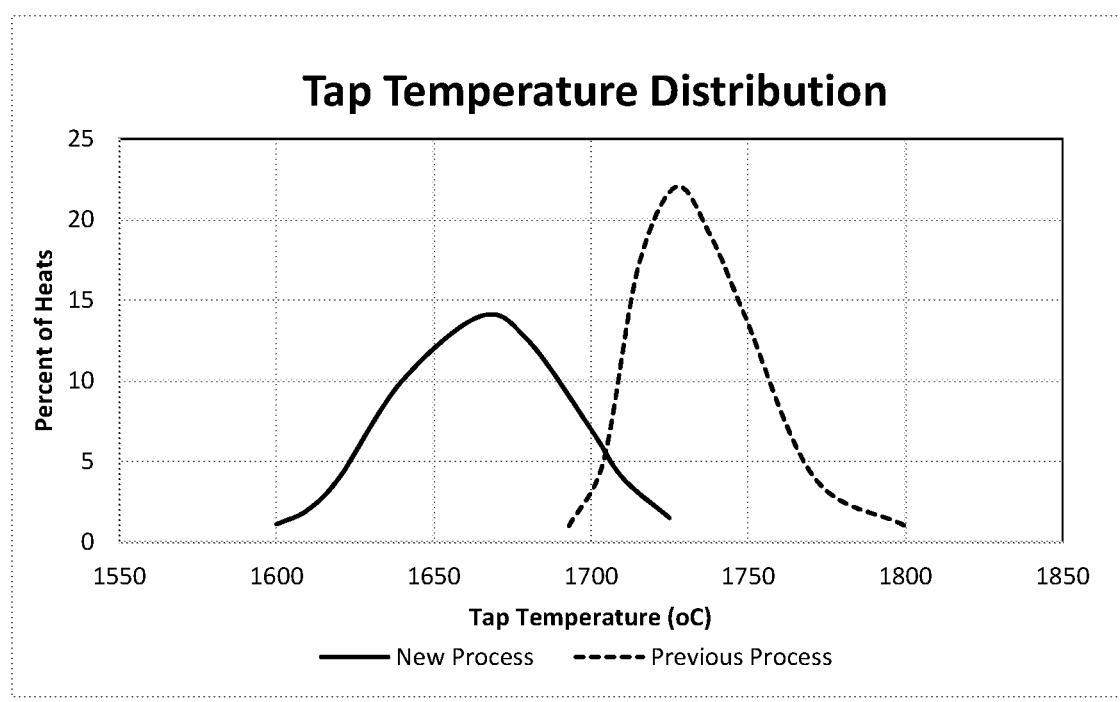
FIG. 4 is a graph of the distribution of steel temperatures when tapping from the electric arc furnace as compared between the prior process and the presently disclosed method.

The tap temperature (prior process and present method) is shown in FIG. 4. As shown in FIG. 4, the average tap temperature decreased with the present method, from 3140° F. to 3020° F. (1727° C. to 1660° C.). The additional decarburization step at the VTD required a slightly higher tap temperature to provide the same VTD exit temperatures.

Figure 5:
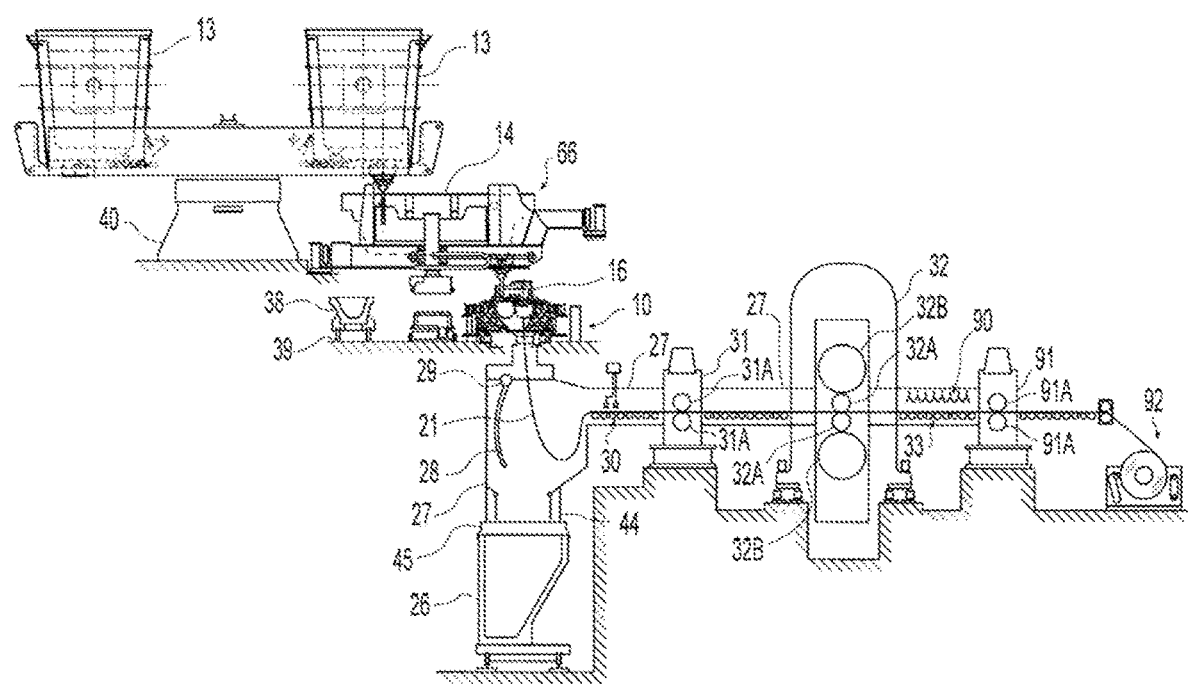
FIG. 5 is an elevational side view of an exemplary strip caster for use with the disclosed methods.
Figure 6:
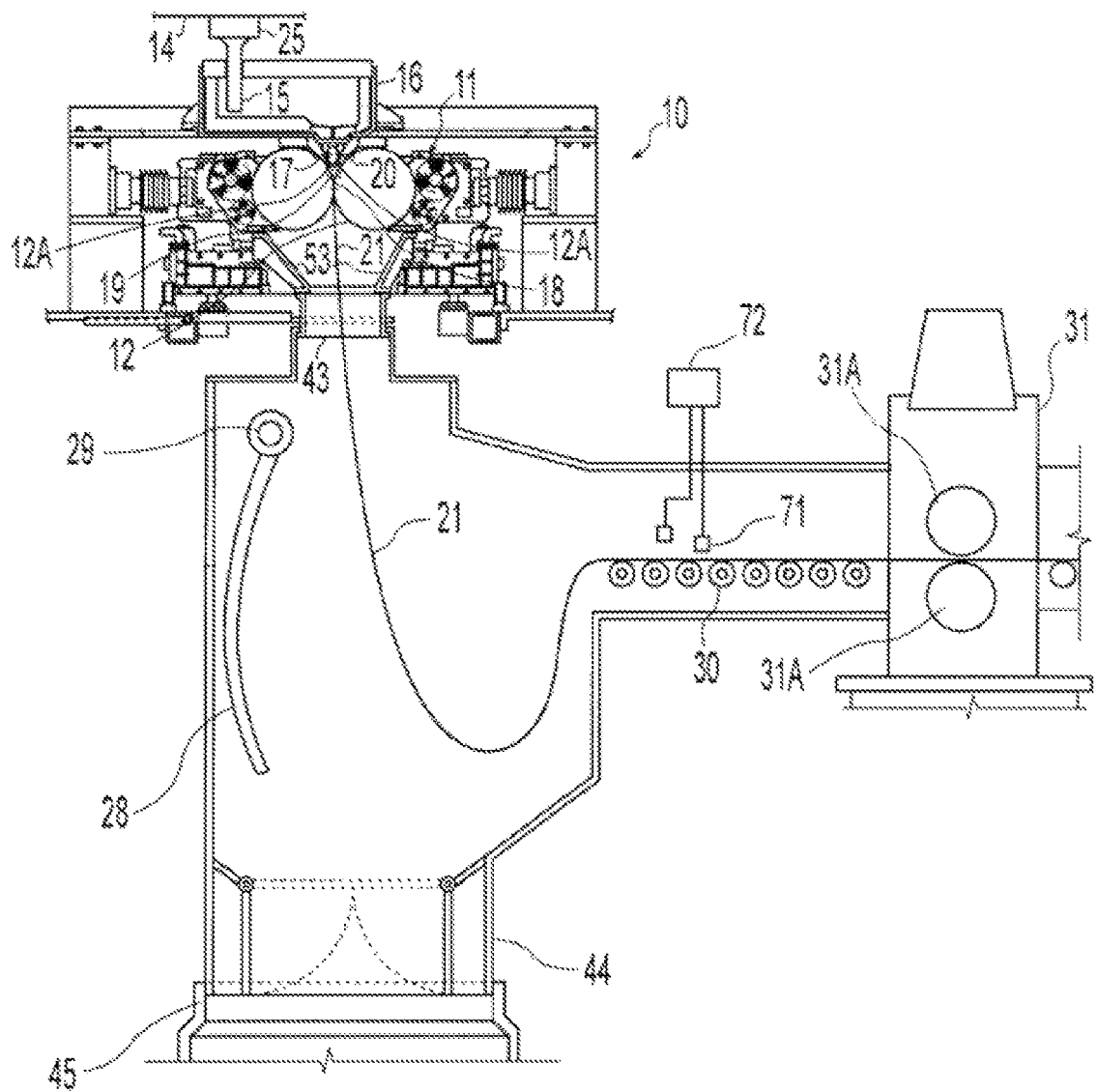
FIG. 6 is an enlarged partial sectional view of a portion of the twin roll caster of FIG. 5.
Figure 6A:
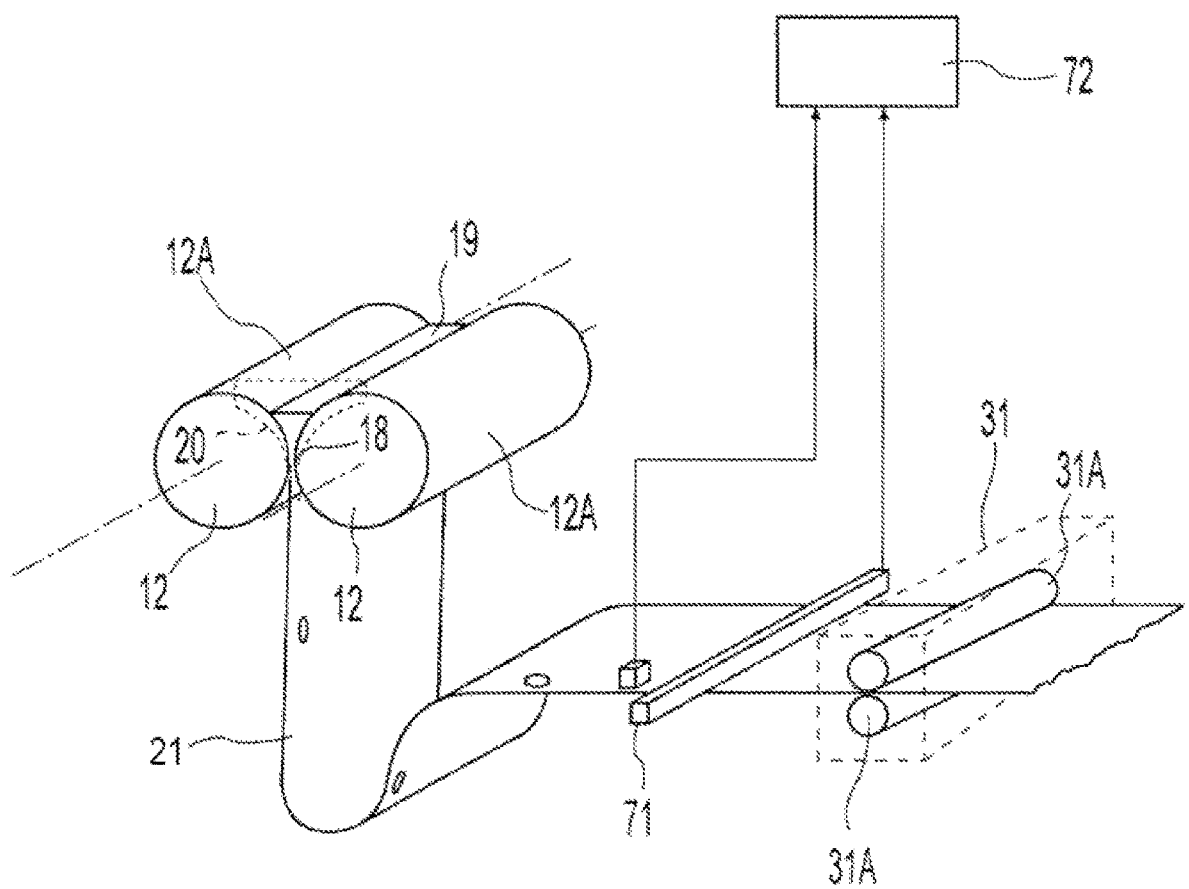
FIG. 6A is a schematic view of a portion of twin roll casters of FIG. 6.

As noted previously, in certain instances, a thin strip is cast using a thin strip caster. While it is appreciated that any thin strip caster may be employed, an exemplary thin strip caster is shown in FIGS. 5, 6, and 6A, the exemplary thin strip caster forming a twin roll caster. The twin roll caster has a main machine frame 10 standing up from the factory floor and supports a pair of counter-rotatable casting rolls 12 mounted in a module in a roll cassette 11. The casting rolls 12 are mounted in the roll cassette 11 for ease of operation and movement as described below. The roll cassette 11 facilitates rapid movement of the casting rolls 12 ready for casting from a setup position into an operative casting position as a unit in the caster, and ready removal of the casting rolls 12 from the casting position when the casting rolls 12 are to be replaced. There is no particular configuration of the roll cassette 11 that is desired, so long as it performs that function of facilitating movement and positioning of the casting rolls 12 as described herein.

With continued reference to FIGS. 5, 6, and 6A, the casting apparatus for continuously casting thin steel strip includes the pair of counter-rotatable casting rolls 12 having casting surfaces 12A laterally positioned to form a nip 18 there between. Molten metal is supplied from a ladle 13 through a metal delivery system to a metal delivery nozzle 17 (core nozzle) positioned between the casting rolls 12 above the nip 18. Molten metal thus delivered forms a casting pool 19 of molten metal above the nip 18 supported on the casting surfaces 12A of the casting rolls 12. This casting pool 19 is confined in the casting area at the ends of the casting rolls 12 by a pair of side closure plates, or side dams 20 (shown in dotted line in FIG. 6A). The upper surface of the casting pool 19 (generally referred to as the "meniscus" level) may rise above the lower end of the delivery nozzle 17 so that the lower end of the delivery nozzle 17 is immersed within the casting pool 19. The casting area includes the addition of a protective atmosphere above the casting pool 19 to inhibit oxidation of the molten metal in the casting area. The casting rolls 12 are internally water cooled so that as the casting rolls 12 are counter-rotated, shells solidify on the casting surfaces 12A, as the casting surfaces 12A move into contact with and through the casting pool 19 with each revolution of the casting rolls 12. The shells are brought close together at the nip 18 between the casting rolls 12 to produce a thin cast strip product 21 delivered downwardly from the nip 18. The thin cast strip product 21 is formed from the shells at the nip 18 between the casting rolls 12 and delivered downwardly and moved downstream.

The ladle 13 of FIGS. 5, 6, and 6A may be of a conventional construction supported on a rotating turret 40. For metal delivery, the ladle 13 is positioned over a movable tundish 14 in the casting position to fill the tundish 14 with molten metal. The movable tundish 14 may be positioned on a tundish car 66 capable of transferring the tundish 14 from a heating station, where the tundish 14 is heated to near a casting temperature, to the casting position. A tundish guide, such as rails, may be positioned beneath the tundish car 66 to enable moving the movable tundish 14 from the heating station to the casting position. The movable tundish 14 may be fitted with a slide gate 25, actuable by a servo mechanism, to allow molten metal to flow from the tundish 14 through the slide gate 25, and then through a refractory outlet shroud 15 to a transition piece or distributor 16 in the casting position. From the distributor 16, the molten metal flows to the delivery nozzle 17 positioned between the casting rolls 12 above the nip 18.

The side dams 20 may be made from a refractory material such as zirconia graphite, graphite alumina, boron nitride, boron nitride-zirconia, or other suitable composites. The side dams 20 have a face surface capable of physical contact with the casting rolls 12 and molten metal in the casting pool 19. The side dams 20 are mounted in side dam holders, which are movable by side dam actuators, such as a hydraulic or pneumatic cylinder, servo mechanism, or other actuator to bring the side dams 20 into engagement with the ends of the casting rolls 12. Additionally, the side dam actuators are capable of positioning the side dams 20 during casting. The side dams 20 form end closures for the molten pool of metal on the casting rolls 12 during the casting operation.

FIG. 5 shows the twin roll caster producing the cast strip 21, which passes across a guide table 30 to a pinch roll stand 31, comprising pinch rolls 31A. Upon exiting the pinch roll stand 31, the thin cast strip 21 may pass through a hot rolling mill 32, comprising a pair of work rolls 32A, and backup rolls 32B, forming a gap capable of hot rolling the cast strip 21 delivered from the casting rolls 12, where the cast strip 21 is hot rolled to reduce the strip to a desired thickness, improve the strip surface, and improve the strip flatness. The work rolls 32A have work surfaces relating to the desired strip profile across the work rolls 32A. The hot rolled cast strip 21 then passes onto a run-out table 33, where it may be cooled by contact with a coolant, such as water, supplied via water jets 90 or other suitable means, and by convection and radiation. In any event, the hot rolled cast strip 21 may then pass through a second pinch roll stand 91 having roller 91A to provide tension of the cast strip 21, and then to a coiler 92. The cast strip 21 may be 0.3 to 2.0 millimeters in thickness before hot rolling.

At the start of the casting operation, a short length of imperfect strip is typically produced as casting conditions stabilize. After continuous casting is established, the casting rolls 12 are moved apart slightly and then brought together again to cause this leading end of the cast strip 21 to break away forming a clean head end of the following cast strip 21. The imperfect material drops into a scrap receptacle 26, which is movable on a scrap receptacle guide. The scrap receptacle 26 is located in a scrap receiving position beneath the caster and forms part of a sealed enclosure 27 as described below. The enclosure 27 is typically water cooled. At this time, a water-cooled apron 28 that normally hangs downwardly from a pivot 29 to one side in the enclosure 27 is swung into position to guide the clean end of the cast strip 21 onto the guide table 30 that feeds it to the pinch roll stand 31. The apron 28 is then retracted back to its hanging position to allow the cast strip 21 to hang in a loop beneath the casting rolls 12 in enclosure 27 before it passes to the guide table 30 where it engages a succession of guide rollers.

An overflow container 38 may be provided beneath the movable tundish 14 to receive molten material that may spill from the tundish 14. As shown in FIG. 5, the overflow container 38 may be movable on rails 39 or another guide such that the overflow container 38 may be placed beneath the movable tundish 14 as desired in casting locations. Additionally, an optional overflow container may be provided for the distributor 16 adjacent the distributor 16.

The sealed enclosure 27 is formed by a number of separate wall sections that fit together at various seal connections to form a continuous enclosure wall that permits control of the atmosphere within the enclosure 27. Additionally, the scrap receptacle 26 may be capable of attaching with the enclosure 27 so that the enclosure 27 is capable of supporting a protective atmosphere immediately beneath the casting rolls 12 in the casting position. The enclosure 27 includes an opening in the lower portion of the enclosure 27, lower enclosure portion 44, providing an outlet for scrap to pass from the enclosure 27 into the scrap receptacle 26 in the scrap receiving position. The lower enclosure portion 44 may extend downwardly as a part of the enclosure 27, the opening being positioned above the scrap receptacle 26 in the scrap receiving position. As used in the specification and claims herein, "seal," "sealed," "sealing," and "sealingly" in reference to the scrap receptacle 26, enclosure 27, and related features may not be a complete seal so as to prevent leakage, but rather is usually less than a perfect seal as appropriate to allow control and support of the atmosphere within the enclosure 27 as desired with some tolerable leakage.

A rim portion 45 may surround the opening of the lower enclosure portion 44 and may be movably positioned above the scrap receptacle 26, capable of sealingly engaging and/or attaching to the scrap receptacle 26 in the scrap receiving position. The rim portion 45 may be movable between a sealing position in which the rim portion 45 engages the scrap receptacle 26, and a clearance position in which the rim portion 45 is disengaged from the scrap receptacle 26. Alternately, the caster or the scrap receptacle 26 may include a lifting mechanism to raise the scrap receptacle 26 into sealing engagement with the rim portion 45 of the enclosure 27, and then lower the scrap receptacle 26 into the clearance position. When sealed, the enclosure 27 and scrap receptacle 26 are filled with a desired gas, such as nitrogen, to reduce the amount of oxygen in the enclosure 27 and provide a protective atmosphere for the cast strip 21.

The enclosure 27 may include an upper collar portion 43 supporting a protective atmosphere immediately beneath the casting rolls 12 in the casting position. When the casting rolls 12 are in the casting position, the upper collar portion 43 is moved to the extended position closing the space between a housing portion 53 adjacent the casting rolls 12, as shown in FIG. 6, and the enclosure 27. The upper collar portion 43 may be provided within or adjacent the enclosure 27 and adjacent the casting rolls 12, and may be moved by a plurality of actuators such as servo-mechanisms, hydraulic mechanisms, pneumatic mechanisms, and rotating actuators.

The casting rolls 12 are internally water cooled as described below so that as the casting rolls 12 are counter-rotated, shells solidify on the casting surfaces 12A, as the casting surfaces 12A move into contact with and through the casting pool 19 with each revolution of the casting rolls 12. The shells are brought close together at the nip 18 between the casting rolls 12 to produce a thin cast strip product 21 delivered downwardly from the nip 18. The thin cast strip product 21 is formed from the shells at the nip 18 between the casting rolls 12 and delivered downwardly and moved downstream as described above.

A strip thickness profile sensor 71 may be positioned downstream to detect the thickness profile of the cast strip 21 as shown in FIGS. 6 and 6A. The strip thickness sensor 71 may be provided between the nip 18 and the pinch rolls 31A to provide for direct control of the casting roll 12. The sensor may be an x-ray gauge or other suitable device capable of directly measuring the thickness profile across the width of the strip periodically or continuously. Alternatively, a plurality of non-contact type sensors may be arranged across the cast strip 21 at the roller table 30 and the combination of thickness measurements from the plurality of positions across the cast strip 21 are processed by a controller 72 to determine the thickness profile of the strip periodically or continuously. The thickness profile of the cast strip 21 may be determined from this data periodically or continuously as desired.

While principles and modes of operation have been explained and illustrated with regard to particular embodiments, it must be understood, however, that the invention may be practiced otherwise than as specifically explained and illustrated without departing from its spirit or scope.

The invention claimed is:

1. A method of making steel with low carbon, less than 0.035% by weight, comprising the steps of:
preparing a heat of molten steel composition in a steel-making furnace to a tapping temperature ranging from 2912 to 3060 degrees F.;
tapping into a ladle the molten steel composition having an oxygen level of about 700 to 1000 ppm;
transporting the molten steel composition in the ladle, after tapping, to a ladle metallurgy furnace where the molten steel composition is further heated and one or more flux elements and/or one or more alloy elements are added to the molten steel composition;

transporting the molten steel composition in the ladle from the ladle metallurgy furnace to a vacuum tank degasser after the ladle metallurgy furnace;

decarburizing the molten steel composition at the vacuum tank degasser;

adding one or more alloying elements and/or one or more flux elements to the molten steel composition at the vacuum tank degasser for deoxidization and desulphurization;

transporting the molten steel composition in the ladle from the vacuum tank degasser and to a ladle metallurgy furnace to further adjust chemistry and temperature; and, casting the molten steel composition to form a steel with low carbon content that is less than 0.035% by weight.

2. The method of claim 1, where while tapping, one or more flux elements and/or one or more alloying elements are added to the molten steel composition.

3. The method of claim 2, where the one or more flux elements and/or one or more alloying elements includes lime and calcium silica.

4. The method of claim 1, where at the ladle metallurgy furnace, the one or more flux elements added include manganese and lime.

5. The method of claim 4, where the manganese is medium carbon manganese (MCMn).

6. The method of claim 1 further comprising:
measuring the oxygen content in molten steel composition before decarburizing processing begins at the vacuum tank degasser.

7. The method of claim 1, where the decarburization of the molten steel composition at the vacuum tank degasser is performed by drawing a vacuum of less than 650 millibars.

8. The method of claim 1, where the decarburization of the molten steel composition is performed with an oxygen level in the molten steel composition correlated with an amount of carbon desired in the steel composition without adding external oxygen to the molten steel composition to determine one or more of the following:
(i) a decarburization time based on the oxygen level and the amount of carbon;
(ii) an amount of deoxidizing addition to the steel composition based on the oxygen level and the amount of carbon; or
(iii) a selection of the one or more flux elements and an amount of the one or more flux elements based on the oxygen level and the amount of carbon.

9. The method of claim 1, where adding one or more alloying elements and/or one or more flux elements to the molten steel composition in the vacuum tank degasser includes adding one or more deoxidizers.

10. The method of claim 9, where the one or more deoxidizers includes at least one of aluminum, ferrosilicon (FeSi), lime, calcium silicate ($Ca_2SiO_4$), and ferrosilicomanganese (FeSiMn).

11. The method of claim 1, where adding one or more alloying elements and/or one or more flux elements to the molten steel composition at the vacuum tank degasser includes adding one or more fluxes selected form a group consisting of lime, dolomitic lime, aluminum, calcium aluminum, wollostonite, fluorspar, silica sand, ferrosilicon, ferrosilicomanganese (FeSiMn), and a perfused synthetic flux.

12. The method of claim 1, where the molten steel composition leaves the ladle metallurgy furnace at substantially 3050 degrees F.

13. The method of claim 1, where the step of casting includes casting a thin cast strip through a thin strip caster.

14. The method of claim 11, where the thin strip caster includes:
a pair of counter-rotatable casting rolls having casting surfaces laterally positioned to form a gap at a nip between the casting rolls through which the thin cast strip having a thickness of less than 5 mm can be cast,
a metal delivery system adapted to deliver the molten steel composition above the nip to form a casting pool, the casting pool being supported on the casting surfaces of the pair of counter-rotatable casting rolls and confined at the ends of the casting rolls,
the method of casting includes:
delivering the molten steel composition to the metal delivery system;
delivering the molten steel composition from metal delivery system above the nip to form the casting pool; and,
counter rotating the pair of counter-rotatable casting rolls to form metal shells on the casting surfaces of the casting rolls that are brought together at the nip to deliver the thin cast strip downwardly, the thin metal strip having a thickness less than 5 mm.

15. The method of claim 1, where the amount of carbon in the molten steel composition during the tapping step is 0.02% to 0.05% by weight.

16. The method of claim 1, where the steel making furnace is in an electric arc furnace.

17. The method of claim 1, where adding one or more alloying elements and/or one or more flux elements to the molten steel composition at the vacuum tank degasser includes adding a desired amount of aluminum at a vacuum level is 530 to 1000 millibars.

18. The method of claim 1, where at the vacuum tank degasser, a vacuum is drawn between about 1 to 2.5 millibar for nitrogen removal.

19. The method of claim 1, where the one or more alloying elements and/or one or more flux elements added at the ladle metallurgy furnace after tapping and before transfer to the vacuum tank degasser are selected from a group consisting of lime, magnesium oxide, calcium aluminate, dolomitic lime, fluorspar, wollastonite, silica sand, ferrosilicon, ferrosilicomanganese, and prefused synthetic flux.

20. The method of claim 1, where the amount of sulfur in the molten steel composition during the tapping step is between about 0.02% and 0.06% by weight.

21. The method of claim 8, where correlating the oxygen level in the molten steel composition with an amount of carbon desired in the steel composition comprises steps of: (i) stirring the molten steel composition in the ladle at the vacuum tank degasser, (ii) measuring and recording the amount of carbon in the steel composition, amount of oxygen in the steel composition, and the temperature of the steel composition, (iii) providing a process model correlating amounts of oxygen and carbon in steel composition with the decarburization time needed to reach a desired amount of carbon in the steel composition; and (iv) determining by the process model the decarburization time based on the measured amounts of oxygen and carbon in the steel composition.

22. The method of claim 8, where correlating the oxygen level in the molten steel composition with an amount of carbon desired in the steel composition comprises steps of: (i) stirring the steel composition in the ladle at the vacuum tank degasser, (ii) measuring and recording the amount of carbon in the steel composition, amount of oxygen in the steel composition, and the temperature of the steel composition, (iii) providing a process model correlating amounts of oxygen and carbon in steel composition with the amount of deoxidizing addition needed to deoxidize the steel composition and (iv) determining by the process model the amount of deoxidizing addition to the steel composition based on the measured amounts of oxygen and carbon.

23. The method of claim 8, where correlating the oxygen level in the molten steel composition with an amount of carbon desired in the steel composition comprises steps of: (i) stirring the steel composition in the ladle at the vacuum tank degasser, (ii) measuring and recording the amount of carbon in the steel composition, amount of oxygen in the steel composition, and the temperature of the steel composition; (iii) providing a process model correlating amounts of oxygen and carbon in steel composition with the amount of the one or more flux elements needed to desulfurize the steel composition, capable of selecting the one or more flux elements based on a price of the one or more flux elements; and (iv) determining by the process model a selection of the one or more flux elements and their amounts based on the measured amounts of oxygen and carbon.

* * * * *